(12) United States Patent  
Chen

(10) Patent No.: US 9,316,268 B2  
(45) Date of Patent: Apr. 19, 2016

(54) CLUTCH SWITCHING DEVICE FOR ELECTRIC ROLLING DOOR

(75) Inventor: Shih-Fang Chen, Taoyuan (TW)

(73) Assignee: Inno Digic Limited, Taoyuan County (TW)

( * ) Notice: Subject to any disclaimer, the term of this patent is extended or adjusted under 35 U.S.C. 154(b) by 275 days.

(21) Appl. No.: 14/234,097

(22) PCT Filed: Jul. 22, 2011

(86) PCT No.: PCT/CN2011/001206  
§ 371 (c)(1),  
(2), (4) Date: Mar. 26, 2014

(87) PCT Pub. No.: WO2013/013337  
PCT Pub. Date: Jan. 31, 2013

(65) Prior Publication Data  
US 2014/0238807 A1 Aug. 28, 2014

(51) Int. Cl.  
*E06B 9/74* (2006.01)  
*F16D 11/00* (2006.01)  
*E06B 9/76* (2006.01)

(52) U.S. Cl.  
CPC . *F16D 11/00* (2013.01); *E06B 9/76* (2013.01); *E05Y 2201/216* (2013.01); *E05Y 2201/244* (2013.01); *E05Y 2201/248* (2013.01); *E05Y 2201/654* (2013.01); *E05Y 2201/68* (2013.01)

(58) Field of Classification Search  
CPC ..... F16D 23/12; F16D 2023/126; F16C 1/12; E06B 9/74  
See application file for complete search history.

(56) References Cited

U.S. PATENT DOCUMENTS

| | | | | |
|---|---|---|---|---|
| 4,706,727 | A | * | 11/1987 | Leivenzon et al. ............ 160/188 |
| 4,976,168 | A | * | 12/1990 | Lotznicker et al. ............ 74/625 |
| 6,739,372 | B2 | * | 5/2004 | Mullet et al. .................. 160/189 |
| 7,564,202 | B2 | | 7/2009 | Hsieh |
| 2013/0133447 | A1 | * | 5/2013 | Leivenzon et al. ........... 74/89.16 |

OTHER PUBLICATIONS

ISR dated Apr. 16, 2012 for PCT/CN2011/001206.

* cited by examiner

*Primary Examiner* — Huan Le  
(74) *Attorney, Agent, or Firm* — Schmeiser, Olsen & Watts, LLP

(57) ABSTRACT

A clutch switching device for electric rolling doors contains: a housing, a rotating plate, and a shifting bar. The rotating plate is provided in the housing for connecting with the clutch pulling cord. The shifting bar is coupled with the rotating plate and is pulled to drive the rotating plate to move toward a manual mode position or an automatic mode position. The rotating plate has a wrenching portion for matching with a wrench tool so as to wrench the rotating plate. The housing includes a movable fixing element, the rotating plate has a first positioning aperture and a second positioning aperture, such that when the rotating plate is located at a manual mode position, the first positioning aperture aligns and retains with the movable fixing element; when the rotating plate is located at the automatic mode position, the second positioning aperture aligns and retains with the movable fixing element.

13 Claims, 6 Drawing Sheets

CLUTCH SWITCHING DEVICE FOR ELECTRIC ROLLING DOOR

FIELD OF THE INVENTION

The present invention relates to a clutch switching device for electronic rolling doors being used for connecting with a clutch pulling cord and containing a shifting bar being pulled to shift a manual mode or an automatic mode; and more particularly to a clutch switching device which when being fixed on a first side surface of a wall, a wrench tool is inserted into a second side surface of the wall so as to shift the clutch switching device to the manual mode or the automatic mode.

BACKGROUND OF THE INVENTION

To avoid an electronic rolling door cannot be opened and closed because of power failure, a conventional clutch switching device is fixed indoors and is shifted to a manual mode position or an automatic mode position by a shifting bar, such that the clutch switching device is shifted to the manual mode in power failure or power outage so as to manually open or close the electronic rolling door.

Because the clutch switching device is fixed on one side surface of a wall indoors, it cannot be shifted to a manual mode when power is failed. To overcome such a problem, a power supply device is in connection with an external power supply or an uninterruptible power system is provided so as to supply power to the electronic rolling door when power failure occurs.

However, installation cost of the external power supply or the uninterruptible power system is quite high, thus reducing using popularity of the external power supply or the uninterruptible power system.

The present invention has arisen to mitigate and/or obviate the afore-described disadvantages.

SUMMARY OF THE INVENTION

The primary object of the present invention is to provide a clutch switching device for electronic rolling doors which is operated in an external controlling manner so that when the electric rolling doors cannot be opened since power failure happens, user manually opens the electric rolling doors outdoors by shifting the clutch switching device 1 to a manual operating mode.

To obtain the above objective, a clutch switching device for electric rolling doors provided by the present invention is used for connecting with a clutch pulling cord and contains:
a housing;
a rotating plate provided in the housing so as to connect with the clutch pulling cord; and
a shifting bar coupled with the rotating plate and being pulled to drive the rotating plate to move toward a manual mode position or an automatic mode position;
wherein the rotating plate has a wrenching portion arranged on a central position thereof and matching with a wrench tool so as to rotatably wrench the rotating plate;
wherein the wrenching portion is a hexagonal recess or a hexagonal hole.
wherein the wrenching portion is in a hexagonal column shape;
wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element;
wherein the rotating plate further has:
a rotary shaft joined with the housing and having the wrenching portion; and
a rotating disc joining with the rotary shaft;
wherein the wrenching portion is a hexagonal recess or a hexagonal hole;
wherein the wrenching portion is in a hexagonal column shape;
wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element.

Also, in order to obtain the above objective, a clutch switching device for electric rolling doors is fixed on a first side surface of a wall and is used for connecting with a clutch pulling cord, the wall has a through hole defined thereon, and the clutch switching device contains:
a housing;
a rotating plate provided in the housing so as to connect with the clutch pulling cord; and
a shifting bar coupled with the rotating plate and being pulled to drive the rotating plate to move toward a manual mode position or an automatic mode position;
wherein the rotating plate has a wrenching portion arranged on a central position thereof and matching with a wrench tool, such that the wrench tool is inserted into the through hole from a second side surface of the wall so as to connect with the wrenching portion and to rotate the rotating plate;
wherein a covering lid is covered on the through hole defined on the second side surface of the wall;
wherein the wrenching portion is a hexagonal recess or a hexagonal hole;
wherein the wrenching portion is in a hexagonal column shape;
wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element;
wherein the rotating plate further has:
a rotary shaft joined with the housing and having the wrenching portion; and
a rotating disc joining with the rotary shaft;
wherein the wrenching portion is a hexagonal recess or a hexagonal hole;
wherein the wrenching portion is in a hexagonal column shape;
wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element.

Thereby, the clutch switching device is operated in an external controlling manner so that when the electric rolling doors cannot be opened since power failure happens, user manually opens the electric rolling doors outdoors by shifting the clutch switching device to a manual operating mode.

DETAILED DESCRIPTION OF THE PREFERRED EMBODIMENTS

Figure 1:
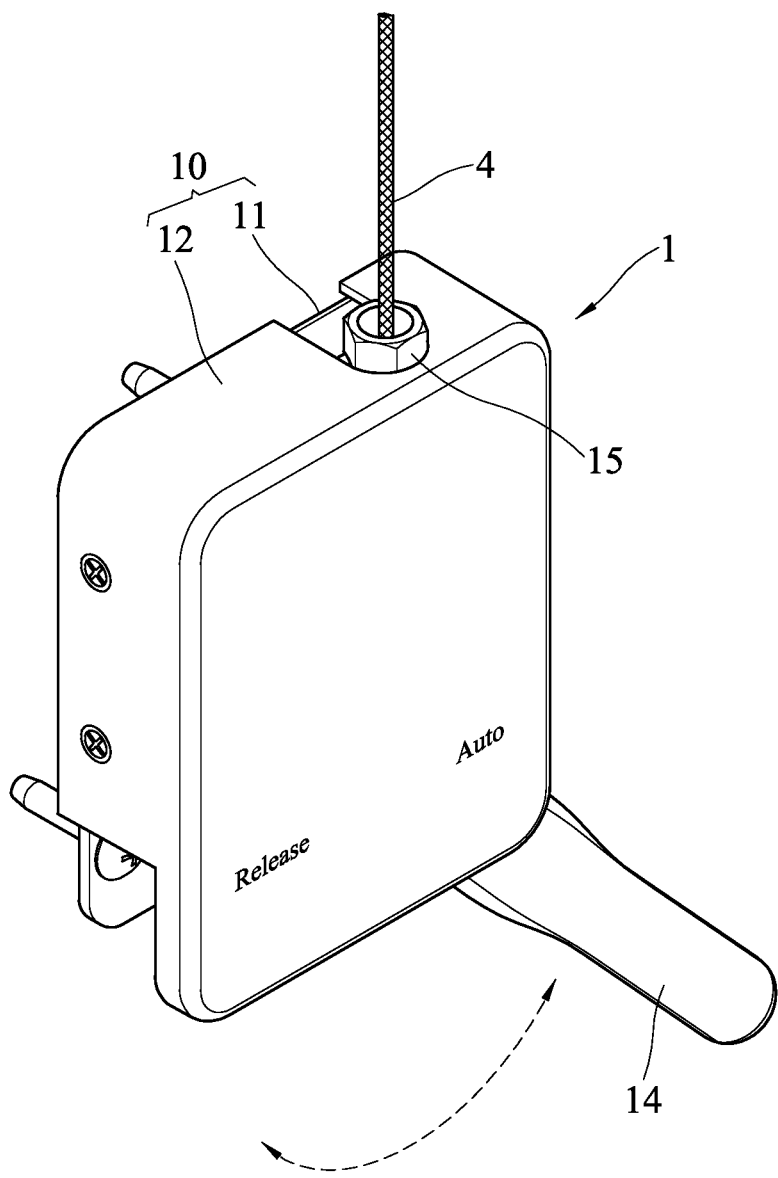
FIG. 1 is a perspective view showing the assembly of a clutch switching device for electric rolling doors according to a preferred embodiment of the present invention.
Figure 2:
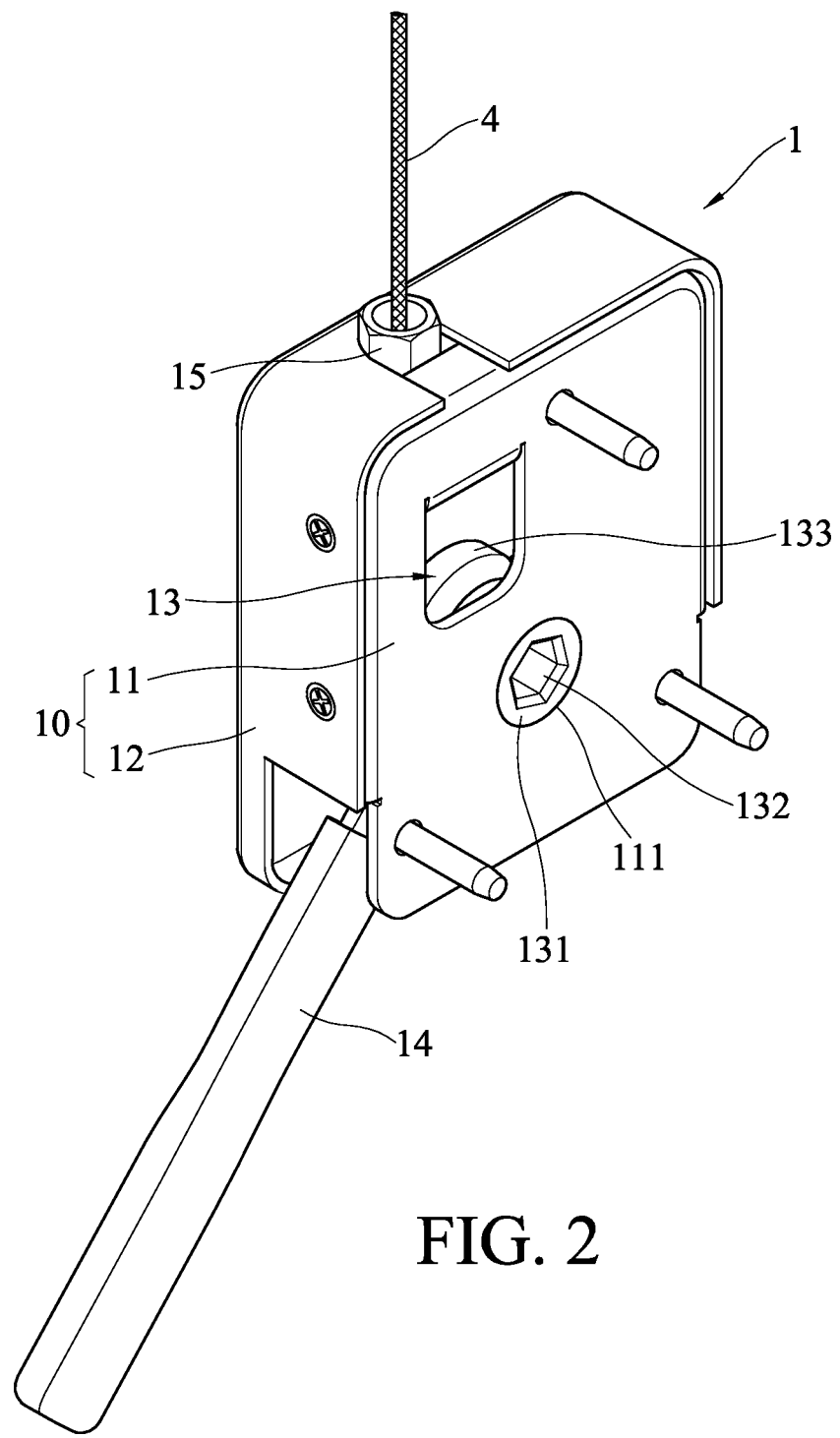
FIG. 2 is another perspective view showing the assembly of the clutch switching device for the electric rolling doors according to the preferred embodiment of the present invention.
Figure 3:
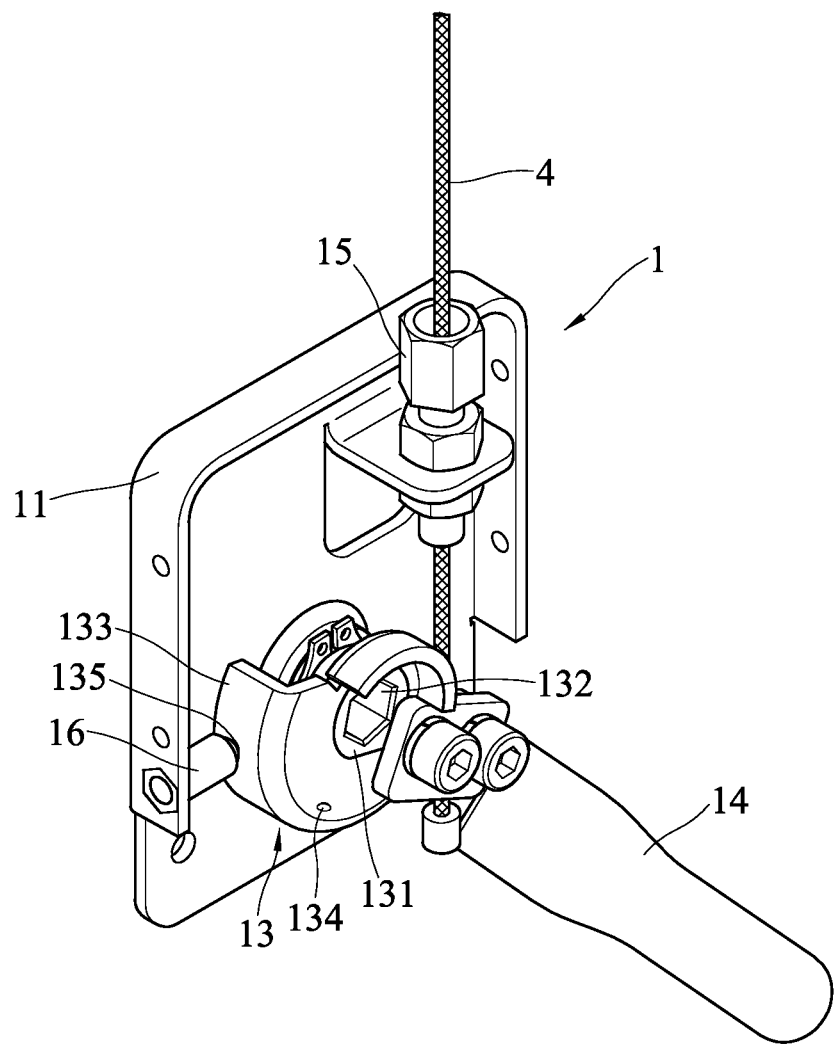
FIG. 3 is a partial perspective view showing the assembly of the clutch switching device for the electric rolling doors according to the preferred embodiment of the present invention.

FIG. 1 is a perspective view showing the assembly of a clutch switching device for electric rolling doors according to a preferred embodiment of the present invention. FIG. 2 is another perspective view showing the assembly of the clutch switching device for the electric rolling doors according to the preferred embodiment of the present invention. FIG. 3 is a partial perspective view showing the assembly of the clutch switching device for the electric rolling doors according to the preferred embodiment of the present invention. With reference to FIGS. 1-3, the clutch switching device 1 is fixed on a first side surface of a wall and is used for connecting with a clutch pulling cord 4; the clutch switching device 1 comprises a housing 10, a rotating plate 13 provided in the housing 10 so as to connect with the clutch pulling cord 4, and a shifting bar 14 coupled with the rotating plate 13, wherein the shifting bar 14 is pulled to drive the rotating plate 13 to move toward a manual mode position or an automatic mode position.

The housing 10 is comprised of a base 11 and a cover 12, the base 11 has a guiding member 15 disposed on one side thereof so as to insert the clutch pulling cord 4, such that the clutch pulling cord 4 is inserted into the housing 10 from an upper end of the housing 10; the base 11 also has a circular orifice 111 defined thereon.

The rotating plate 13 has a wrenching portion 132 arranged on a central position thereof and aligning with the circular orifice 111 of the base 11, such that the wrenching portion 132 receives a wrench tool so as to rotatably wrench the rotating plate 13 toward the manual mode position or the automatic mode position.

In other words, the rotating plate 13 not only is rotated by the shifting bar 14, but also is rotated by the wrench tool, for example, the wrench tool is inserted through the base 11 to couple with the wrenching portion 132 of the rotating plate 13 so that the wrench tool is wrenched to rotate the rotating plate 13, thus shifting the rotating plate 13 toward the manual mode position or the automatic mode position.

The rotating plate 13 further has a rotary shaft 131 joined with the housing 10 and a rotating disc 133 joining with the wrenching portion 132, and the rotary shaft 131 has the wrenching portion 132 arranged therein. In this embodiment, the rotary shaft 131 and the rotating disc 133 are one piece formed.

In this embodiment, the wrenching portion 132 is a hexagonal recess or a hexagonal hole for matching with a hex wrench. Furthermore, the wrenching portion 132 is in a hexagonal column shape so as to cooperate with a hexagon socket wrench.

Figure 4A:
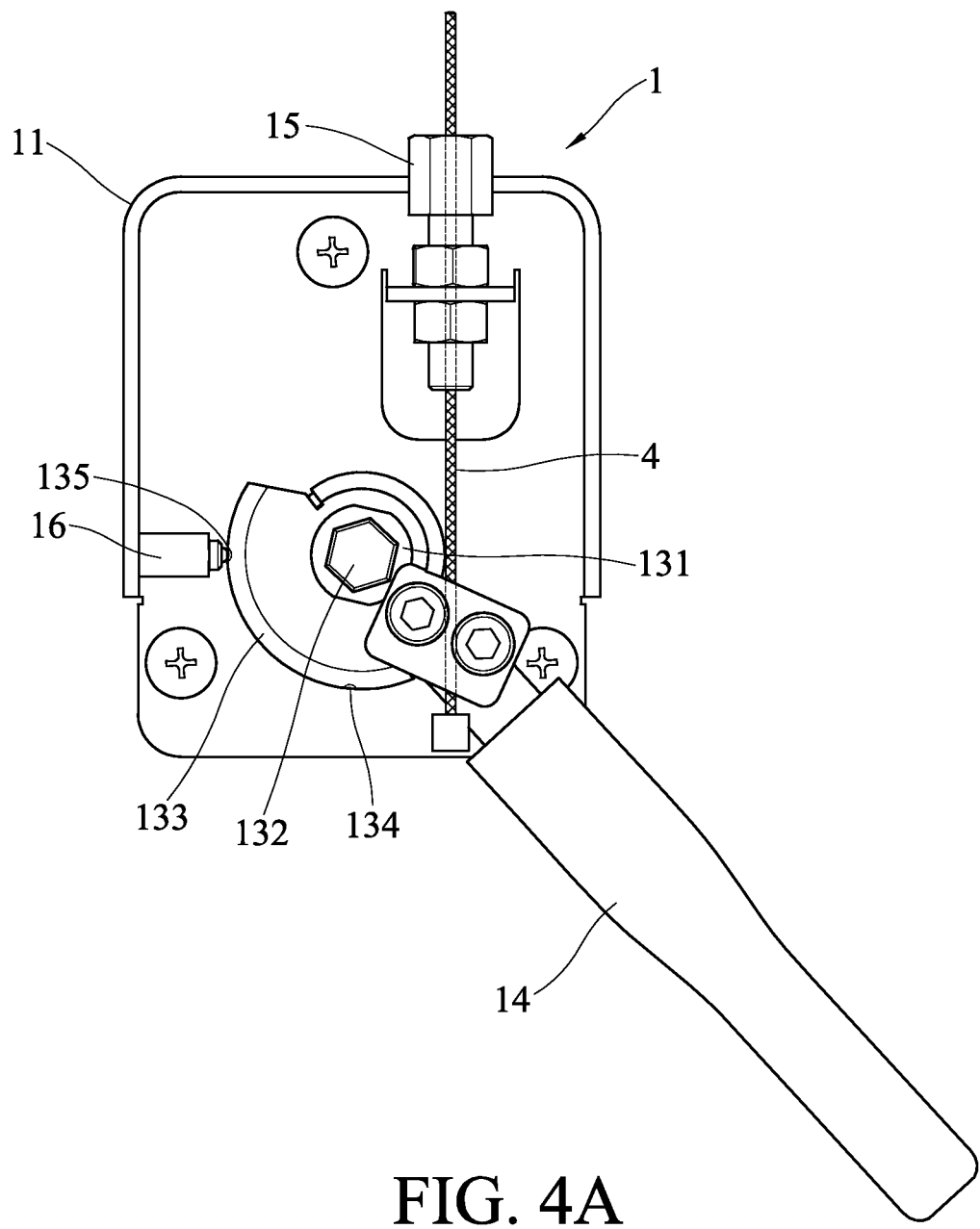
FIG. 4A is a plan view showing the rotating plate of the clutch switching device being shifted toward the automatic mode position.
Figure 4B:
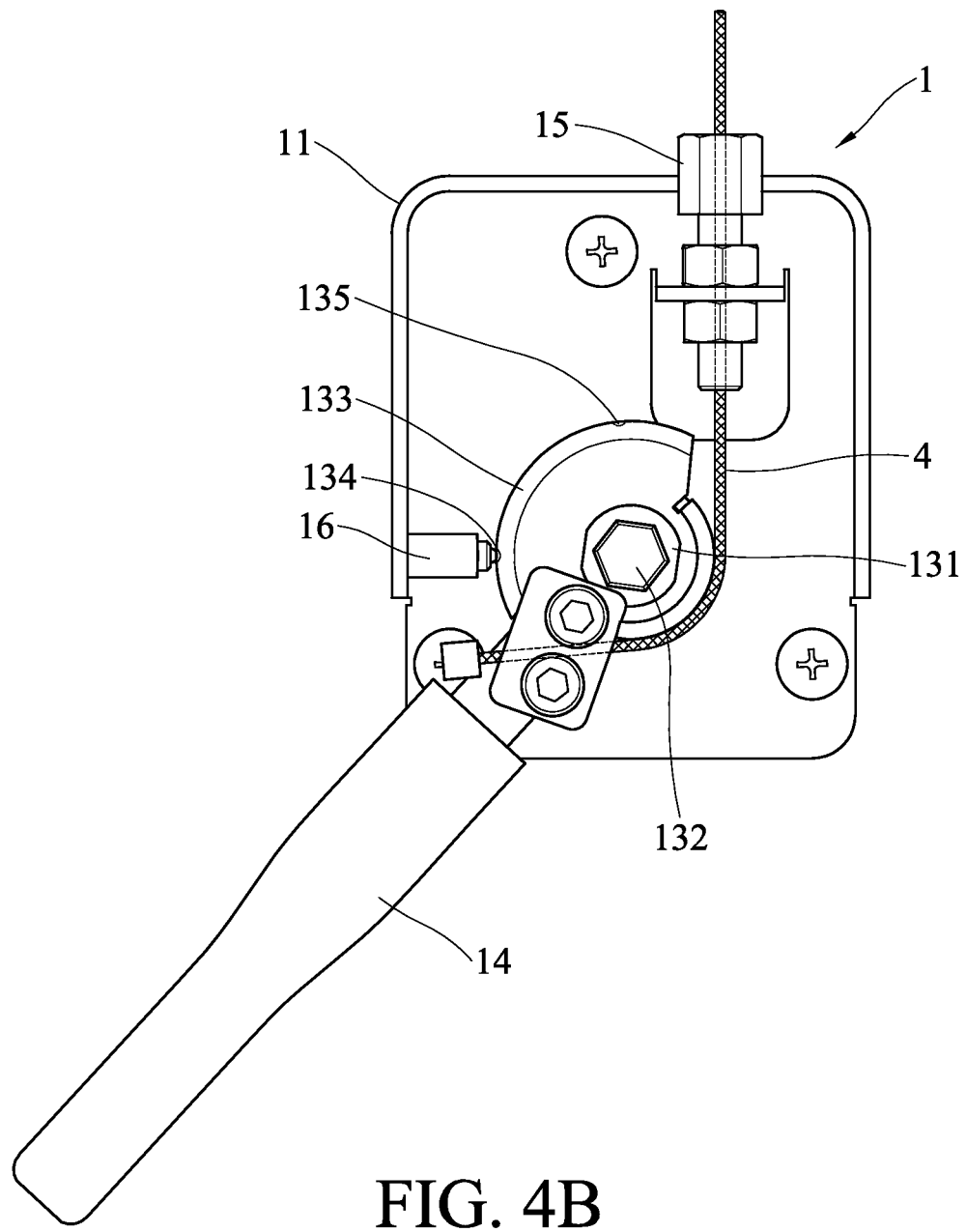
FIG. 4B is a plan view showing the rotating plate of the clutch switching device being shifted toward the manual mode position.

FIG. 4A is a plan view showing the rotating plate 13 of the clutch switching device 1 being shifted toward the automatic mode position, and FIG. 4B is a plan view showing the rotating plate 13 of the clutch switching device 1 being shifted toward the manual mode position; wherein the wrench tool is inserted into the base 11 so as to connect with the wrenching portion 132, hence the rotating plate 13 is shifted toward the automatic mode position from the manual mode position.

To position the rotating plate 13 after it is shifted toward the automatic mode position or the manual mode position, the housing 10 further includes a movable fixing element 16 mounted therein, and the rotating plate 13 has a first positioning aperture 134 and a second positioning aperture 135, such that when the rotating plate 13 is located at the manual mode position, the first positioning aperture 134 aligns and retains with the movable fixing element 16; and when the rotating plate 13 is located at the automatic mode position, the second positioning aperture 135 aligns and retains with the movable fixing element 16.

Figure 5:
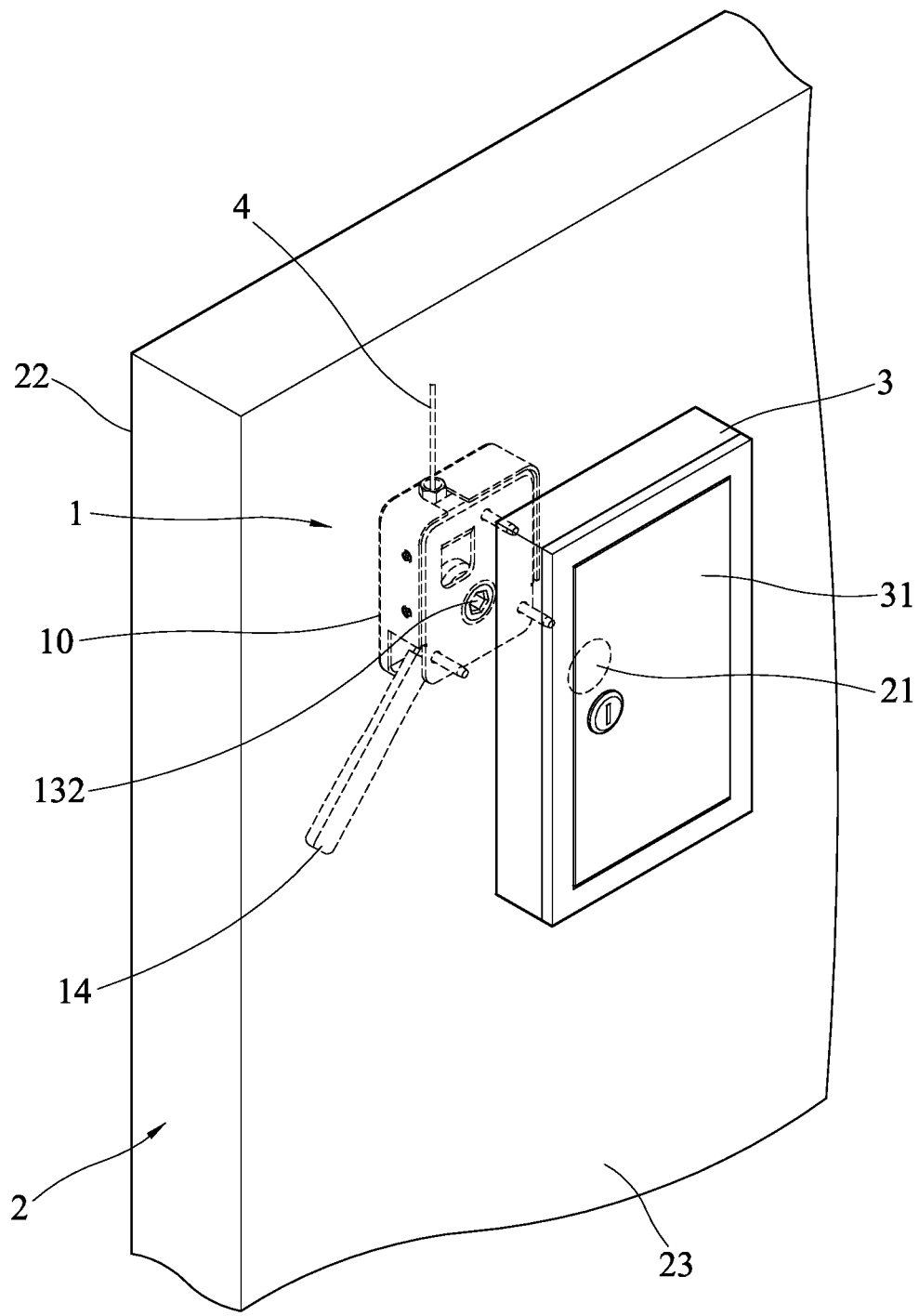
FIG. 5 is a perspective view showing the clutch switching device being fixed on the wall.

FIG. 5 is a perspective view showing the clutch switching device being fixed on the wall; the wall 2 has a through hole 21 defined thereon, and the clutch switching device is fixed on the first side surface 22 of the wall 2 so that the wrenching portion 132 aligns with the through hole 21; hence the wrench tool is inserted into the through hole 21 from a second side surface 23 so as to connect with the wrenching portion 132 and to rotate the rotating plate 13, thus shifting the rotating plate 13 toward the manual mode position or the automatic mode position.

To avoid the clutch switching device 1 being operated by a thief or an intruder from the through hole 21, a covering lid 3 is covered on the through hole 21 defined on the second side surface 23 and has a protective sheet 31 fixed thereon and opened by a key, or the covering lid 3 has a padlock provided thereon and opened by the key.

Thereby, the clutch switching device 1 is operated in an external controlling manner so that when the electric rolling doors cannot be opened since power failure happens, user manually opens the electric rolling doors outdoors by shifting the clutch switching device 1 to a manual operating mode.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A clutch switching device for electric rolling doors being used for connecting with a clutch pulling cord and comprising:
   a housing;
   a rotating plate provided in the housing so as to connect with the clutch pulling cord; and a shifting bar coupled with the rotating plate and being pulled to drive the rotating plate to move toward a manual mode position or an automatic mode position;

wherein the rotating plate has a wrenching portion arranged on a central position thereof and matching with a wrench tool so as to rotatably wrench the rotating plate;

wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element.

2. The clutch switching device for the electric rolling doors as claimed in claim 1, wherein the wrenching portion is a hexagonal recess or a hexagonal hole.

3. The clutch switching device for the electric rolling doors as claimed in claim 1, wherein the wrenching portion is in a hexagonal column shape.

4. The clutch switching device for the electric rolling doors as claimed in claim 1, wherein the rotating plate further has:
- a rotary shaft joined with the housing and having the wrenching portion; and
- a rotating disc joining with the rotary shaft.

5. The clutch switching device for the electric rolling doors as claimed in claim 4, wherein the wrenching portion is a hexagonal recess or a hexagonal hole.

6. The clutch switching device for the electric rolling doors as claimed in claim 4, wherein the wrenching portion is in a hexagonal column shape.

7. A clutch switching device for electric rolling doors being fixed on a first side surface of a wall and being used for connecting with a clutch pulling cord, the wall having a through hole defined thereon, and the clutch switching device comprising:
- a housing;
- a rotating plate provided in the housing so as to connect with the clutch pulling cord; and
- a shifting bar coupled with the rotating plate and being pulled to drive the rotating plate to move toward a manual mode position or an automatic mode position;

wherein the rotating plate has a wrenching portion arranged on a central position thereof and matching with a wrench tool, such that the wrench tool is inserted into the through hole from a second side surface of the wall so as to connect with the wrenching portion and to rotate the rotating plate;

wherein the housing includes a movable fixing element mounted therein, and the rotating plate has a first positioning aperture and a second positioning aperture, such that when the rotating plate is located at a manual mode position, the first positioning aperture aligns and retains with the movable fixing element; and when the rotating plate is located at the automatic mode position, the second positioning aperture aligns and retains with the movable fixing element.

8. The clutch switching device for the electric rolling doors as claimed in claim 7, wherein a covering lid is covered on the through hole defined on the second side surface of the wall.

9. The clutch switching device for the electric rolling doors as claimed in claim 7, wherein the wrenching portion is a hexagonal recess or a hexagonal hole.

10. The clutch switching device for the electric rolling doors as claimed in claim 7, wherein the wrenching portion is in a hexagonal column shape.

11. The clutch switching device for the electric rolling doors as claimed in claim 7, wherein the rotating plate further has:
- a rotary shaft joined with the housing and having the wrenching portion; and
- a rotating disc joining with the rotary shaft.

12. The clutch switching device for the electric rolling doors as claimed in claim 7, wherein the wrenching portion is a hexagonal recess or a hexagonal hole.

13. The clutch switching device for the electric rolling doors as claimed in claim 7, wherein the wrenching portion is in a hexagonal column shape.

* * * * *